US012750278B2

(12) United States Patent
Durrani et al.

(10) Patent No.: US 12,750,278 B2
(45) **Date of Patent: *Sep. 29, 2026**

(54) TENANT-DRIVEN DYNAMIC RESOURCE ALLOCATION FOR VIRTUAL NETWORK FUNCTIONS

(71) Applicant: Equinix, Inc., Redwood City, CA (US)

(72) Inventors: Muhammad Durrani, San Jose, CA (US); Jayanthi Jayaraman, San Jose, CA (US); Syed Hashim Iqbal, San Jose, CA (US); Janardhana Achladi, San Jose, CA (US); Rizwan Jamal, San Jose, CA (US); John Hanahan, Saratoga, CA (US)

(73) Assignee: Equinix, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,682

(22) Filed: Mar. 20, 2023

(65) Prior Publication Data

US 2023/0231817 A1 Jul. 20, 2023

Related U.S. Application Data

(63) Continuation of application No. 16/888,280, filed on May 29, 2020, now Pat. No. 11,611,517.

(51) Int. Cl.
*H04L 12/24* (2006.01)
*G06F 9/455* (2018.01)
(Continued)

(52) U.S. Cl.
CPC ...... *H04L 41/0896* (2013.01); *H04L 41/0895* (2022.05); *H04L 41/40* (2022.05);
(Continued)

(58) Field of Classification Search
CPC ..... H04L 47/822; H04L 47/80; H04L 47/801; H04L 47/823; H04L 41/0895;
(Continued)

(56) References Cited

U.S. PATENT DOCUMENTS 7,430,741 B2 9/2008 Ayachitula et al.
7,453,804 B1 * 11/2008 Feroz .................... H04L 47/522 370/468
(Continued)

FOREIGN PATENT DOCUMENTS

CA 2471426 C 4/2008
CN 103210618 A 7/2013
(Continued)

OTHER PUBLICATIONS

Bhamare et al., "Optimal Virtual Network Function Placement in Multi-Cloud Service Function Chaining Architecture," Computer Communications, vol. 102, Apr. 2017, 18 pp.
(Continued)

*Primary Examiner* — Umar Cheema
*Assistant Examiner* — Golam Mahmud
(74) *Attorney, Agent, or Firm* — Shumaker & Sieffert, P.A.

(57) ABSTRACT

Techniques for tenant-driven dynamic resource allocation in network functions virtualization infrastructure (NFVI). In one example, an orchestration system is operated by a data center provider for a data center and that orchestration system comprises processing circuitry coupled to a memory; logic stored in the memory and configured for execution by the processing circuitry, wherein the logic is operative to: compute an aggregate bandwidth for a plurality of flows associated with a tenant of the data center provider and processed by a virtual network function, assigned to the tenant, executing on a server of the data center; and modify,
(Continued)

based on the aggregate bandwidth, an allocation of compute resources of the server executing the virtual network function.

16 Claims, 6 Drawing Sheets

(51) Int. Cl.
*H04L 12/26* (2006.01)
*H04L 12/801* (2013.01)
*H04L 12/911* (2013.01)
*H04L 12/917* (2013.01)
*H04L 29/12* (2006.01)
*H04L 41/0895* (2022.01)
*H04L 41/0896* (2022.01)
*H04L 41/40* (2022.01)
*H04L 43/20* (2022.01)
*H04L 47/70* (2022.01)
*H04L 47/80* (2022.01)
*H04L 47/83* (2022.01)

(52) U.S. Cl.
CPC .............. *H04L 43/20* (2022.05); *H04L 47/80* (2013.01); *H04L 47/801* (2013.01); *H04L 47/822* (2013.01); *H04L 47/83* (2022.05)

(58) Field of Classification Search
CPC ..... H04L 41/40; H04L 43/0876; H04L 43/20; H04L 41/142; H04L 43/028; H04L 41/0816; H04L 41/0896; H04L 41/046; H04L 41/0806; H04L 41/5009; H04L 43/026
See application file for complete search history.

(56) References Cited

U.S. PATENT DOCUMENTS

| | | | | |
|---|---|---|---|---|
| 7,719,983 | B2 * | 5/2010 | Pendarakis | G06F 9/5061 370/231 |
| 8,429,276 | B1 | 4/2013 | Kumar et al. | |
| 8,438,283 | B2 | 5/2013 | Chen et al. | |
| 8,935,427 | B2 * | 1/2015 | Outhred | H04L 12/4633 709/244 |
| 9,338,099 | B2 | 5/2016 | Sundar et al. | |
| 9,515,933 | B2 * | 12/2016 | DeCusatis | H04L 12/4633 |
| 9,621,853 | B1 | 4/2017 | Yang et al. | |
| 9,705,783 | B2 * | 7/2017 | Jogalekar | H04L 45/38 |
| 9,847,915 | B2 | 12/2017 | Ashwood-Smith et al. | |
| 9,860,164 | B2 * | 1/2018 | Jilani | H04L 45/566 |
| 9,886,267 | B2 | 2/2018 | Maheshwari et al. | |
| 9,913,151 | B2 | 3/2018 | Li et al. | |
| 9,948,552 | B2 | 4/2018 | Teng et al. | |
| 9,979,602 | B1 | 5/2018 | Chinnakannan et al. | |
| 10,057,127 | B2 * | 8/2018 | Zhu | H04W 24/02 |
| 10,129,078 | B2 | 11/2018 | Kumar et al. | |
| 10,149,193 | B2 * | 12/2018 | Cui | H04L 41/0895 |
| 10,375,700 | B1 * | 8/2019 | Toy | H04W 28/0242 |
| 10,439,870 | B2 * | 10/2019 | Chen | G06F 9/46 |
| 11,677,622 | B2 * | 6/2023 | Sethi | G06F 9/5083 709/224 |
| 11,909,603 | B2 * | 2/2024 | Singh | H04L 47/822 |
| 2004/0100967 | A1 * | 5/2004 | Robotham | H04L 47/30 370/412 |
| 2008/0049753 | A1 * | 2/2008 | Heinze | H04L 47/822 370/392 |
| 2008/0273591 | A1 * | 11/2008 | Brooks | H04N 21/6373 375/240.01 |
| 2011/0274117 | A1 | 11/2011 | Zhang et al. | |
| 2014/0007097 | A1 * | 1/2014 | Chin | G06F 9/5077 718/1 |
| 2014/0137110 | A1 * | 5/2014 | Engle | G06F 9/5022 718/1 |
| 2015/0003463 | A1 * | 1/2015 | Li | H04L 12/4641 370/395.53 |
| 2015/0254203 | A1 * | 9/2015 | Higuchi | G06F 9/5011 710/314 |
| 2015/0365325 | A1 * | 12/2015 | Hwang | H04L 47/70 370/230 |
| 2016/0203528 | A1 * | 7/2016 | Saha | G06F 9/45558 705/34 |
| 2016/0246652 | A1 * | 8/2016 | Herdrich | G06F 9/5077 |
| 2016/0328259 | A1 * | 11/2016 | Xia | H04L 41/28 |
| 2016/0373474 | A1 * | 12/2016 | Sood | G06F 21/53 |
| 2017/0085628 | A1 | 3/2017 | Mahindra et al. | |
| 2017/0126792 | A1 * | 5/2017 | Halpern | H04L 43/0894 |
| 2017/0237650 | A1 * | 8/2017 | Beeram | H04L 45/48 370/390 |
| 2017/0310609 | A1 * | 10/2017 | Kim | H04L 41/06 |
| 2017/0339573 | A1 * | 11/2017 | Yamada | H04W 16/04 |
| 2017/0371717 | A1 * | 12/2017 | Kiess | G06F 9/5077 |
| 2018/0077080 | A1 * | 3/2018 | Gazier | H04L 47/83 |
| 2018/0183682 | A1 * | 6/2018 | Niwa | G06F 11/3006 |
| 2018/0210765 | A1 * | 7/2018 | McCormick | G06F 9/5077 |
| 2019/0004837 | A1 * | 1/2019 | Tiwary | H04L 67/10 |
| 2019/0014056 | A1 * | 1/2019 | Sharma | H04L 47/762 |
| 2019/0045000 | A1 * | 2/2019 | Hiremath | H04L 49/501 |
| 2019/0102312 | A1 | 4/2019 | McDonnell et al. | |
| 2019/0123973 | A1 * | 4/2019 | Jeuk | G06N 20/00 |
| 2019/0171474 | A1 * | 6/2019 | Malboubi | H04L 61/5007 |
| 2019/0173771 | A1 * | 6/2019 | Behera | H04L 41/142 |
| 2019/0173779 | A1 * | 6/2019 | Gruner | H04L 61/5014 |
| 2019/0319892 | A1 * | 10/2019 | Ganguli | H04L 47/745 |
| 2019/0334771 | A1 * | 10/2019 | Milojicic | G06F 11/3051 |
| 2020/0067782 | A1 | 2/2020 | Yousaf | |
| 2020/0106834 | A1 * | 4/2020 | Perez | H04L 67/1097 |
| 2020/0134207 | A1 * | 4/2020 | Doshi | H04L 47/822 |
| 2020/0136943 | A1 * | 4/2020 | Banyai | H04L 41/5019 |
| 2020/0236043 | A1 * | 7/2020 | Sze | H04L 45/302 |
| 2020/0344089 | A1 * | 10/2020 | Motwani | G06F 9/5077 |
| 2020/0387406 | A1 | 12/2020 | Xu et al. | |
| 2021/0028923 | A1 * | 1/2021 | Ryou | H04L 9/14 |
| 2021/0029218 | A1 * | 1/2021 | Huang | H04L 67/10 |
| 2021/0075697 | A1 * | 3/2021 | Dattagupta | H04L 41/0895 |
| 2021/0336865 | A1 * | 10/2021 | Nishiki | H04L 43/0876 |
| 2021/0377185 | A1 | 12/2021 | Durrani et al. | |
| 2021/0392043 | A1 * | 12/2021 | Sethi | G06F 9/5083 |
| 2022/0197819 | A1 * | 6/2022 | Kumar | G06F 12/109 |

FOREIGN PATENT DOCUMENTS

| | | | | |
|---|---|---|---|---|
| CN | 106716925 A | 5/2017 | | |
| CN | 107395508 A | 11/2017 | | |
| CN | 108540405 A | 9/2018 | | |
| CN | 109218158 A | 1/2019 | | |
| EP | 3040860 A1 | 6/2016 | | |
| EP | 3343368 A1 | 4/2018 | | |
| WO | 2016012924 A | 1/2016 | | |
| WO | WO-2019109039 A1 * | 6/2019 | | H04L 41/0816 |

OTHER PUBLICATIONS

European Telecommunications Standards Institute (etsi),: Network Functions Virtualisation (NFV); Management and Orchestration, ETSI GS NFV-MAN 001 V1.1.1, Dec. 1, 2014, pp. 1-184.
Herrera et al., "Resource Allocation in NFV: A Comprehensive Survey," IEEE Transactions on Network and Service Management, 13(3), Sep. 2016, 16 pp.
International Preliminary Report on Patentability from International Application No. PCT/US2020/067710 dated Dec. 8, 2022, 9 pp.
International Search Report and Written Opinion of International Application No. PCT/US2020/067710, mailed Apr. 20, 2021, 16 pp.
Prosecution History from U.S. Appl. No. 16/888,280, dated Apr. 22, 2021 through Feb. 17, 2023, 115 pp.
Rahman S., et al., "Auto-Scaling Network Service Chains Using Machine Learning and Negotiation Game", IEEE Transactions on Network and Service Management, vol. 17, No. 3, May 19, 2020, pp. 1322-1336.

(56) References Cited

OTHER PUBLICATIONS

U.S. Appl. No. 17/019,001, by Kempf et al., filed Sep. 11, 2020.
Response to Communication Pursuant to Rules 161(1) and 162 EPC dated Jan. 11, 2023, from counterpart European Application No. 20848771.0, filed Jul. 18, 2023, 87 pp.
First Examination Report from counterpart Australian Application No. 2020450956 dated Nov. 20, 2023, 3 pp.
Notice of Intent to Grant from counterpart Australian Application No. 2020450956 dated Apr. 11, 2024, 7 pp.
Response to Office Action dated Nov. 20, 2023, from counterpart Australian Application No. 2020450956 filed Mar. 13, 2024, 21 pp.
First Office Action and Search Report, and translation thereof, from counterpart Chinese Application No. 202080101492.7 dated Jul. 18, 2024, 12 pp.
Notice of Intent to Grant and Text Intended to Grant from counterpart European Application No. 20848771.0 dated Jan. 15, 2025, 99 pp.
Second Office Action and translation thereof from counterpart Chinese Application No. 202080101492.7 dated Mar. 22, 2025, 14 pp.
Extended Search Report from counterpart European Application No. 25175876.9 dated Aug. 18, 2025, 12 pp.
First Examination Report from counterpart Australian Application No. 2024205411 dated Jul. 31, 2025, 3 pp.
Third Office Action and Search Report, and translation thereof, from counterpart Chinese Application No. 202080101492.7 dated Jul. 16, 2025, 14 pp.
Notice of Intent to Grant from counterpart Application No. 11202254734W dated Sep. 25, 2025, 4 pp.
Notice of Intent to Grant from counterpart Chinese Application No. 202080101492.7 dated Oct. 1, 2025, 5 pp.
Communication pursuant to Article 94(3) EPC from counterpart European Application No. 25175876.9 dated Mar. 31, 2026, 8 pp.
Response to Communication Pursuant to Rule 69/Rule 70a(1) dated Sep. 22, 2025, from counterpart European Application No. 25175876.9, filed Mar. 17, 2026, 85 pp.
Notice of Intent to Grant from counterpart Australian Application No. 2024205411 dated Jul. 30, 2026, 3 pp.
Response to Communication pursuant to Article 94(3) EPC dated Mar. 31, 2026, from counterpart European Application No. 25175876.9 filed Jul. 27, 2026, 86 pp.
Response to Office Action dated Jul. 31, 2025, from counterpart Australian Application No. 2024205411 filed Jul. 1, 2026, 24 pp.

* cited by examiner

TENANT-DRIVEN DYNAMIC RESOURCE ALLOCATION FOR VIRTUAL NETWORK FUNCTIONS

This application is a continuation of U.S. patent application Ser. No. 16/888,280, filed May 29, 2020, the entire contents of which is incorporated herein by reference.

TECHNICAL FIELD

The disclosure relates to computer networks and, more specifically, to Virtual Network Functions provided on computer networks.

BACKGROUND

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices. Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, the benefits of virtualization have increased substantially. As another advantage, virtualized network functions may be executed by servers, switches, storage devices, and cloud computing infrastructure, instead of having custom hardware appliances for each network function.

A network operator may provide a Network Functions Virtualization (NFV) architecture or infrastructure (NFVI) that is capable of orchestration and management of multiple virtualized network functions (VNFs) or physical devices that apply network functions (or "services") to flows of packets in an ordered sequence. An example VNF instance may provide firewall, routing/switching, carrier grade network address translation (CG-NAT), performance enhancement proxies for video, transport control protocol (TCP) optimization and header enrichment, caching, load balancing, or other network functions. To implement a service chain, VNF instances are interconnected using one or more virtual networks, by which packet flows are forwarded along the ordered sequence for application of the network functions that make up the service chain. A service in a service chain that is applied by one or more VNF instances may be scaled up, responsive to increased load, by spawning more VNF instances. Likewise, the service may be scaled down, responsive to decreased load, by deleting one or more of the VNF instances spawned for the service. The one or more VNF instances for a single service may be hosted by separate computing devices, e.g., compute nodes or servers, but a computing device may host multiple VNF instances for one or more services.

SUMMARY

In general, this disclosure describes techniques in which a network service orchestrator for network function virtualization infrastructure (NFVI) dynamically allocates compute resources among virtual network functions assigned to tenants based on tenant-flow statistics. For example, an NFVI provider may deploy NFVI that hosts VNFs that are assigned to multiple different customers tenants, also referred to more simply as tenants or customers, of the NFVI provider. Each VNF executes its corresponding network function to process packet flows that are associated with the one of the tenants of the NFVI provider to which the VNF is assigned. As described herein, a network service orchestrator for the NFVI dynamically distributes physical resources, such as a number of processing cores in a server of the NFVI, among the VNFs executing on the server based on actual utilization of the VNFs for processing flows associated with tenants assigned to the VNFs.

The described techniques may provide one or more technical advantages that present at least one practical application. For example, techniques described herein may improve compute resource utilization by enabling a server's compute resources to execute more VNFs through on-demand resource allocation while still meeting tenant service level agreements (SLAs) for flow processing. For instance, when a tenant's actual bandwidth utilization allocated to a VNF, as determined using tenant-flow statistics, does not reach the allocated bandwidth for the VNF (and corresponding processing resource allocation under a static allocation scheme), there is an envelope of unused processing resources that is dynamically re-assigned to one or more other VNFs. As such, implementing these techniques described herein may increase the maximum number of VNFs executing at one time on a server.

As additional advantages, these techniques allow for tenant-driven dynamic resource allocation by an orchestration system in a data center rather than from a component within the same server as the tenant's VNF. The orchestration system provides a number of benefits to resource allocation, including access to tenant-flow statistics for multiple VNFs spread across the NFVI and assigned to multiple different tenant. For at least this reason, such dynamic resource allocation may be performed even when the tenant's customer devices are not in the same data center environment (e.g., an interconnection facility) as the NFVI on which the tenant VNF is executing.

In one example, an orchestration system operated by a data center provider for a data center, the orchestration system comprising: processing circuitry coupled to a memory; logic stored in the memory and configured for execution by the processing circuitry, wherein the logic is operative to: compute an aggregate bandwidth for a plurality of flows associated with a tenant of the data center provider and processed by a virtual network function, assigned to the tenant, executing on a server of the data center; and modify, based on the aggregate bandwidth, an allocation of compute resources of the server for executing the virtual network function.

In one example, a method of an orchestration system operated by a data center provider for a data center, the method comprising: computing, by the orchestration system, an aggregate bandwidth for a plurality of flows associated with a tenant of the data center provider and processed by a virtual network function, assigned to the tenant, executing on a server of the data center; and by the orchestration system, modifying, based on the aggregate bandwidth, an allocation of compute resources of the server executing the virtual network function.

In one example, an interconnection system comprising: at least one interconnection facility and a programmable network platform, the at least one interconnection facility including: a cluster comprising one or more computing devices to host virtual network functions (VNFs) for tenants, wherein each tenant corresponds to one or more VNFs forming a virtual router through which packet flows are exchanged between a service and a customer, the programmable network platform being configured to: compute an aggregate bandwidth for a plurality of flows associated with a tenant of the tenants and processed by a VNF of the VNFs, assigned to the tenant, executing on a computing device of the cluster; and modify, based on the aggregate bandwidth, an allocation of compute resources of the computing device executing the virtual network function.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
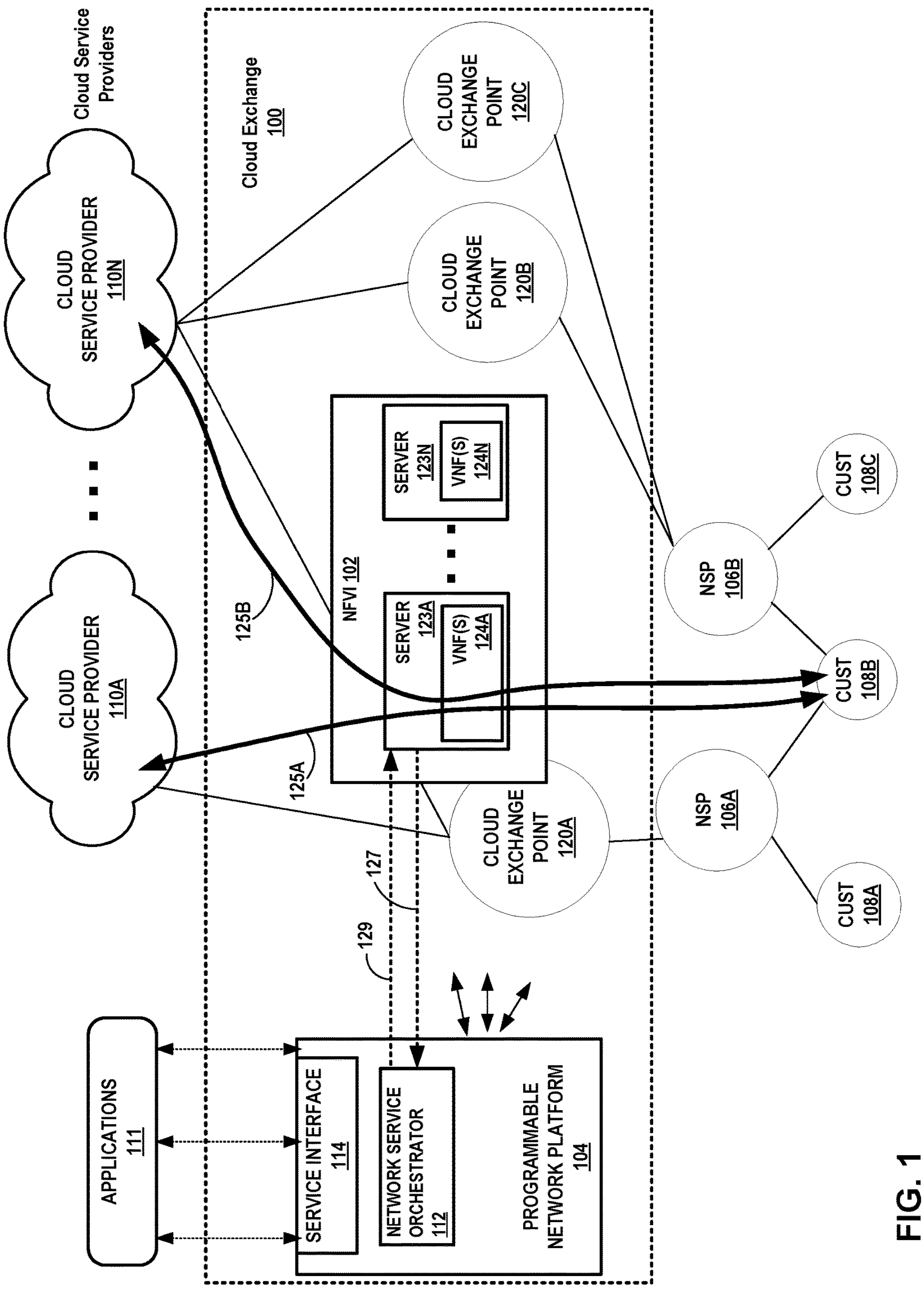
FIG. 1 is a block diagram that illustrates a conceptual view of a network system having a metro-based cloud exchange that provides multiple cloud exchange points and with network function virtualization infrastructure, in accordance with techniques described herein.

FIG. 1 is a block diagram that illustrates a conceptual view of a network system having a metro-based cloud exchange that provides multiple cloud exchange points and with network function virtualization infrastructure, in accordance with techniques described herein. Each of cloud-based services exchange points 120A-120C (described hereinafter as "cloud exchange points" and collectively referred to as "cloud exchange points 120") of cloud-based services exchange 100 ("cloud exchange 100") may represent a different data center (or interconnection facility) geographically located within the same metropolitan area ("metro-based," e.g., in New York City, New York; Silicon Valley, California; Seattle-Tacoma, Washington; Minneapolis-St. Paul, Minnesota; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 120. In some instances, a cloud exchange 100 includes just one cloud exchange point 120. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 120.

Any one or more of cloud exchange points 120 may be used to implement, at least in part, NFVI 102. Each of cloud exchange points 120 includes network infrastructure and an operating environment by which cloud customers 108A-108C (collectively, "cloud customers 108") receive cloud services from multiple cloud service providers 110A-110N (collectively, "cloud service providers 110"). The cloud service provider 110 may host one of more cloud services. As noted above, the cloud service providers 110 may be public or private cloud service providers.

Cloud exchange 100 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer may connect to the one or more cloud services offered by the CSPs, respectively. Cloud exchange 100 allows private networks of any customer to be directly cross-connected to any other customer at a common point, thereby allowing direct exchange of network traffic between the networks of the customers.

Cloud customers 108 may receive cloud-based services directly via a layer 3 peering and physical connection to one of cloud exchange points 120 or indirectly via one of network service providers 106A-106B (collectively, "NSPs 106," or alternatively, "carriers 106"). Cloud customers 108 may include customers associated with a VNF 306A as described above. For example, cloud customers 108 may include systems used by any or all of customer devices used by cloud client 118 to access cloud services via VNF executing in NFVI 102 of cloud exchange points 120. NSPs 106 provide "cloud transit" by maintaining a physical presence within one or more of cloud exchange points 120 and aggregating layer 3 access from one or customers 108. NSPs 106 may peer, at layer 3, directly with one or more cloud exchange points 120 and in so doing offer indirect layer 3 connectivity and peering to one or more customers 108 by which customers 108 may obtain cloud services from the cloud exchange 100. Each of cloud exchange points 120, in the example of FIG. 1, is assigned a different autonomous system number (ASN). For example, cloud exchange point 120A is assigned ASN 1, cloud exchange point 120B is assigned ASN 2, and so forth. Each cloud exchange point 120 is thus a next hop in a path vector routing protocol (e.g., BGP) path from cloud service providers 110 to customers 108. As a result, each cloud exchange point 120 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 120 may internalize the eBGP peering relationships that cloud service providers 110 and customers 108 would maintain on a pair-wise basis. Instead, a customer 108 may configure a single eBGP peering relationship with a cloud exchange point 120 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108C is illustrated as having contracted with a cloud exchange provider for cloud exchange 100 to directly access layer 3 cloud services via cloud exchange points 120C. In this way, customer 108C receives redundant layer 3 connectivity to cloud service provider 110A, for instance. Customer 108C, in contrast, is illustrated as having contracted with the cloud exchange provider for cloud exchange 100 to directly access layer 3 cloud services via cloud exchange point 120C and also to have contracted with NSP 106B to access layer 3 cloud services via a transit network of the NSP 106B. Customer 108B is illustrated as having contracted with multiple NSPs 106A, 106B to have redundant cloud access to cloud exchange points 120A, 120B via respective transit networks of the NSPs 106A, 106B. The contracts described above are instantiated in network infrastructure of the cloud exchange points 120 by L3 peering configurations within switching devices of NSPs 106 and cloud exchange points 120 and L3 connections, e.g., layer 3 virtual circuits, established within cloud exchange points 120 to interconnect cloud service provider 110 networks to NSPs 106 networks and customer 108 networks, all having at least one port offering connectivity within one or more of the cloud exchange points 120.

In some examples, cloud exchange 100 allows a corresponding one of customer customers 108A, 108B of any network service providers (NSPs) or "carriers" 106A-106B (collectively, "carriers 106") or other cloud customers including customers 108C to be directly connected, via a virtual layer 2 (L2) or layer 3 (L3) connection to any other customer network and/or to any of CSPs 110, thereby allowing direct exchange of network traffic among the customer networks and CSPs 110. The virtual L2 or L3 connection may be referred to as a "virtual circuit."

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers 108 may already have network presence, such as by having one or more accessible ports available for interconnection within the data center, which may represent any of cloud exchange points 120. This allows the participating carriers, customers, and CSPs to have a wide range of interconnectivity options within the same facility. A carrier/customer may in this way have options to create many-to-many interconnections with only a one-time hook up to one or more cloud exchange points 120. In other words, instead of having to establish separate connections across transit networks to access different cloud service providers or different cloud services of one or more cloud service providers, cloud exchange 100 allows customers to interconnect to multiple CSPs and cloud services.

Cloud exchange 100 includes programmable network platform 104 for dynamically programming cloud exchange 100 to responsively and assuredly fulfill service requests that encapsulate business requirements for services provided by cloud exchange 100 and/or cloud service providers 110 coupled to the cloud exchange 100. Programmable network platform 104 may include network service orchestrator 112 that handles tenant (e.g., cloud client) requests for deployment of VNFs. For example, network service orchestrator 112 may organize, direct and integrate underlying services through virtual machines (or containers), as well as other software and network sub-systems, for managing various services (e.g., deployment of VNFs). The programmable network platform 104 may, as a result, orchestrate a business-level service across heterogeneous cloud service providers 110 according to well-defined service policies, quality of service policies, service level agreements, and costs, and further according to a service topology for the business-level service.

Hardware and/or software components for NFVI 102 implement network management and resource orchestration systems of which at least one, in general, performs at least one technique described herein. In one example, the network management and resource orchestration systems form an architecture having at least three functional blocks of which one example functional block, an orchestration system, is responsible for onboarding of new network services (NS) and virtual network function (VNF) packages; NS lifecycle management; global and local resource management; and validation and authorization of network functions virtualization infrastructure (NFVI) resource requests. In some examples, network service orchestrator 112 in programmable network platform 104 is an example of the orchestration system while, in other examples, the orchestration system instructs (e.g., by way of function call) network service orchestrator 112 to dynamically allocate resources (e.g., compute) resources. Other functional blocks (e.g., management blocks) oversee lifecycle management of VNF instances; fill the coordination and adaptation role for configuration and event reporting between NFV infrastructure (NFVI) and Element/Network Management Systems, and control and manage the NFVI compute, storage, and network resources. While shown separately as part of programmable network platform 104, these management blocks may reside in NFVI 102 and cooperate with the orchestration system when deploying VNFs.

NFVI 102 includes one or more servers 123A-123N (servers 123) for executing/hosting virtual network functions (VNFs) 124A-124N that apply network services to packet flows. Network service orchestrator 112 handles deployment and organization of these network services, for example, by instantiating VNFs on servers 123 to execute such network services.

The programmable network platform 104 enables the cloud service providers 110 that administer the cloud exchange 100 to dynamically configure and manage the cloud exchange 100 to, for instance, facilitate virtual connections for cloud-based services delivery from multiple cloud service providers 110 to one or more cloud customers 108. The cloud exchange 100 may enable cloud customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 104 enables the cloud service provider to configure cloud exchange 100 with a L3 instance requested by a cloud customer 108, as described herein. A customer 108 may request an L3 instance to link multiple cloud service providers by the L3 instance, for example (e.g., for transferring the customer's data between two cloud service providers, or for obtaining a mesh of services from multiple cloud service providers).

Programmable network platform 104 may represent an application executing within one or more data centers of the cloud exchange 100 or alternatively, off-site at a back office or branch of the cloud provider (for instance). Programmable network platform 104 may be distributed in whole or in part among the data centers, each data center associated with a different cloud exchange point 120 to make up the cloud exchange 100. Although shown as administering a single cloud exchange 100, programmable network platform 104 may control service provisioning for multiple different cloud exchanges. Alternatively or additionally, multiple separate instances of the programmable network platform 104 may control service provisioning for respective multiple different cloud exchanges.

In the illustrated example, programmable network platform 104 includes a service interface (or "service API") 114 that defines the methods, fields, and/or other software primitives by which applications 111, such as a customer portal, may invoke the programmable network platform 104. The service interface 114 may allow carriers 106, customers 108, cloud service providers 110, and/or the cloud exchange provider programmable access to capabilities and assets of the cloud exchange 100 according to techniques described herein.

For example, the service interface 114 may facilitate machine-to-machine communication to enable dynamic provisioning of virtual circuits in the cloud exchange for interconnecting customer and/or cloud service provider networks. In this way, the programmable network platform 104 enables the automation of aspects of cloud services provisioning. For example, the service interface 114 may provide an automated and seamless way for customers to establish, de-install and manage interconnections among multiple, different cloud providers participating in the cloud exchange.

Further example details of a cloud-based services exchange can be found in U.S. patent application Ser. No. 15/099,407, filed Apr. 14, 2006 and entitled "CLOUD-BASED SERVICES EXCHANGE;" U.S. patent application Ser. No. 14/927,451, filed Oct. 29, 2005 and entitled "INTERCONNECTION PLATFORM FOR REAL-TIME CONFIGURATION AND MANAGEMENT OF A CLOUD-BASED SERVICES EXCHANGE;" and U.S. patent application No. 14/927,106, filed Oct. 29, 2005and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Customer 108B represents (or includes) a tenant network for cloud exchange 100. Customer 108B exchanges packetized data in packet flows with one or more other networks, e.g., via virtual circuits or other connection through cloud exchange point 120A. In some cases, NFVI 102 applies one or more network services to the packet flows on behalf of a tenant associated with customer 108.

In the illustrated example, customer 108B exchanges packets for packet flow 125A with cloud service provider network 110A and for packet flow 125B with cloud service provider network 110N. A VNF of the one or more VNFs 124A executed by server 123A applies a network function, in some cases as part of a network service, to packets for the packet flows 125A-125B (collectively, "packet flows 125"). This VNF may be referred to as the tenant VNF in that it is assigned to or otherwise associated with a tenant of the NFVI 102 provider (here, also the cloud exchange 100 provider). In other words, the tenant VNF processes packet flows 125 associated with the tenant. The tenant VNF may be leased or sold to the tenant by NFVI 102 provider, or the tenant may deploy the tenant VNF to server 123A or virtual execution elements thereof. Virtual execution elements may include virtual machines or containers. The tenant may invoke service interface 114 or otherwise request a service chain in NFVI 102 that includes the tenant VNF for packet flows destined to and/or sourced by customer 108B. Server 123A may execute multiple VNFs 124A associated with multiple different tenants, each VNF of the VNFs 124A processing one or more packet flows associated with the tenant for that VNF.

In accordance with techniques of this disclosure, network service orchestrator 112 for NFVI 102 dynamically distributes physical resources, such as a number of processing cores in each of servers 123, among the VNFs 124 executing on any of servers 123 based on actual utilization of the VNFs 124 for processing flows associated with tenants associated with the VNFs 124. For example, network service orchestrator 112 generates flow statistics for server 123A that indicates a bandwidth for each of flows 125 forwarded by server 123A. That is, server 123A performs flow monitoring of flows traversing server 123A and generates flow records 127 for the flows. Network service orchestrator 112 collects the flow records, which are usable for computing an estimated bandwidth for each of the flows as well as other flow properties, such as the virtual network interface of server 123A used by the flow and the source and destination network address for the flow. Using the collected flow records, network service orchestrator 112 computes estimated bandwidths for each of flows 125. In addition, network service orchestrator 112 determines, based on the flow records, that flows 125 are associated with customer 108B that is a tenant of the NFVI provider. Network service orchestrator 112 may consolidate this computed data into tenant-flow statistics.

In an example where packet flows are encapsulated in frames that are transmitted under User Datagram Protocol (UDP), perform the following steps to compute the estimated bandwidth:

1) Assuming sFlow sampling rate of 0.25%, 50000 packets are Samples with total Packets/Frames on wire are 20,000,000.
2) Suppose each packet is carrying 1518 bytes, then the total number of bytes sent on wire are computed as 20,000,000×1518=30,360,000,000.
3) Converting bytes to bits for a total number of bits is computed as 30360,000,000×8.
4) Dividing the total number of bits by an average latency measured on link produces a total bandwidth utilization rate. For example, if the latency is sixty (60) seconds, then the total bandwidth utilization rate is computed as (30360,000,000×8)/60 or 4048000000 bits/second (i.e., 4,048 Megabits per second (Mbps)).

In an example where packet flows are transmitted under Transmission Control Protocol (TCP), perform the following steps to compute the estimated bandwidth:

1) Convert a TCP window size from bytes to bits.
2) Using the standard 64KB TCP window size where 64KB=65536 Bytes, the TCP window size in bits would be computed as 65536*8=524288 bits.
3) After converting the TCP window in bits, divide that window by a round trip latency of a link in seconds. If the round trip latency is thirty (30) milliseconds), the bandwidth utilization rate may be computed as 524288 bits/0.030 seconds=17476266 bits per second throughput or 17.4 Mbps maximum possible throughput.

Tenant-flow statistics generally includes measured or computed packet flow information (e.g., packet size, packets per second, estimated bandwidth, and/or the like) for flows associated with each of one or more tenants of the NFVI 102 provider. As described above, network service orchestrator 112 may map tenant information to flow records to determine which flows are associated with at least one specific tenant. As described herein, the tenant-flow statistics may indicate actual aggregate bandwidth processed by a tenant VNF for a tenant and that information can be compared with resource allocation information to dynamically allocate resources. For example, in response to determining that the aggregate bandwidth processed by a tenant VNF of VNFs 124A does not satisfy a bandwidth allocation/requirement, the techniques described herein may modify an allocation of computer resources of server 123A, such as a number of processor cores or an amount of memory, allocated for use by the tenant VNF.

In this way, by determining a rate at which a server 123A forwards each of packets flows 125 associated with a tenant, the rates correspondingly indicates the rates at which tenant VNF processes packet flows 125 (e.g., an aggregate bandwidth or throughput of the tenant VNF). These rates can be combined to obtain an aggregate bandwidth, and in response to determining the aggregate bandwidth for the packet flows 125 associated with the tenant and processed by the tenant VNF, network service orchestrator 112 may compare the aggregate bandwidth to a bandwidth requirement provided by resource allocation information for the VNFs and produce a comparison result. The comparison result may indicate an expected aggregate bandwidth for the tenant VNF that indicates more or fewer compute resources needed to process the expected aggregate bandwidth versus the currently allocated amount of compute resources for the tenant VNF. As a result and therefore based on the aggregate bandwidth, network service orchestrator 112 may output configuration data 129 to cause server 123 to modify an allocation of compute resources of server 123A to allocate accordingly more or fewer compute resources for executing the tenant VNF. In some examples, network service orchestrator 112 periodically repeats this comparison and maintains comparison results for determining a trend such that, over time, a correlation may be identified between a number of processor cores needed and actual bandwidth usage. This correlation may be a function or lookup table that network service orchestrator 112 uses to determine the appropriate number of processor cores to satisfy an expected bandwidth for executing the tenant VNF to continue processing flows 125 (and in some cases other flows associated with customer 108B). Although described herein as primarily being performed by a network service orchestrator, the techniques described in this disclosure may be performed by a separate computing system, such as a controller or application, that having determined a modification to compute resources for a tenant VNF, invokes network service orchestrator 112 to request the modification to the compute resources for the tenant VNF in NFVI 102.

Figure 2:
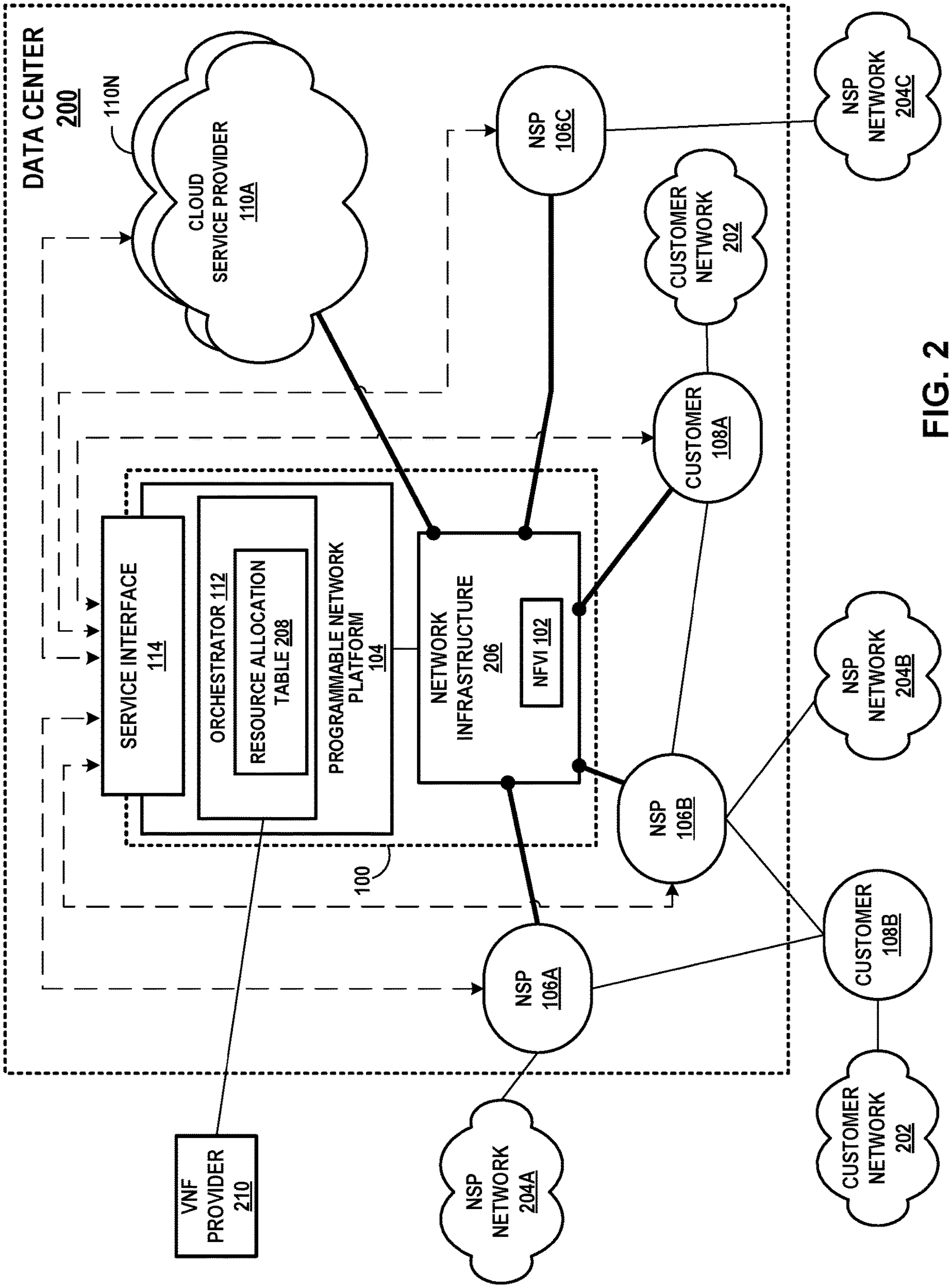
FIG. 2 is a block diagram illustrating an example data center that provides an operating environment for VNFs with tenant-driven resource allocation, in accordance with one or more aspects of the techniques described in this disclosure.

FIG. 2 is a block diagram illustrating an example data center that provides an operating environment for VNFs with tenant-driven resource allocation, in accordance with one or more aspects of the techniques described in this disclosure.

In this example data center, cloud exchange 100 allows a corresponding one of customer networks 202A, 202B and NSP networks 204A-204C (collectively, "NSP or 'carrier' networks 204") of any NSPs 106A-106C or other customers to be directly cross-connected, via a layer 2 (L2) or layer 3 (L3) connection to any other customer network, thereby allowing exchange of service traffic among the customer networks and CSPs 110. Data center 200 may be entirely located within a centralized area, such as a warehouse or localized data center complex, and provide power, cabling, security, and other services to NSPs, customers, and cloud service providers that locate their respective networks within the data center 200 (e.g., for colocation) and/or connect to the data center 200 by one or more external links.

Cloud exchange 100 includes network infrastructure 206 (e.g., for a virtual network) and an operating environment by which customer networks 202 may receive services from one or more CSPs 110 via interconnections. In the example of FIG. 2, network infrastructure 206 represents the switching fabric of an interconnection facility of cloud exchange 100 and includes multiple ports that may be dynamically interconnected with virtual circuits by, e.g., invoking service interface 114 of the programmable network platform 104. Each of the ports is associated with NSPs 106, customers 108, and CSPs 110. This enables an NSP customer to have options to create many-to-many interconnections with only a one-time hook up to the switching network and underlying network infrastructure 206 that presents an interconnection platform for cloud exchange 100. In other words, instead of having to establish separate connections across transit networks to access different CSPs 110, cloud exchange 100 allows a customer to interconnect to multiple CSPs 110 using network infrastructure 206 within data center 200.

An interconnection as described herein may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective network devices (e.g., routers and/or switches) of interconnected customers directly peer and exchange layer 3 routes for service traffic exchanged via network infrastructure 206, and a cloud exchange in which customer routers peer with network infrastructure 206 (or "provider") network devices rather than directly with other customers. Cloud exchange 100 may provide, to customers, interconnection services to network services provided by CSPs 110. That is, an interconnection service by cloud exchange 100 provides access to a network service (e.g., VNF) provided by CSPs 110.

For interconnections at layer 3 or above, customers 108 may receive services directly via a layer 3 peering and physical connection to one of colocation facility exchange points or indirectly via one of NSPs 106. NSPs 106 provide "transit" by maintaining a physical presence within data center 200 and aggregating layer 3 access from one or more customers 108. NSPs 106 may peer, at layer 3, directly with data center 200 and in so doing offer indirect layer 3 connectivity and peering to one or more customers 108 by which customers 108 may obtain services from the cloud exchange 100.

In instances in which cloud exchange 100 offers an internet exchange, network infrastructure 206 may be assigned a different autonomous system number (ASN). Network infrastructure 206 is thus a next hop in a path vector routing protocol (e.g., BGP) path from CSPs 110 to customers 108 and/or NSPs 106. As a result, cloud exchange 100 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more CSPs 110 to customers 108. In other words, cloud exchange 100 may internalize the eBGP peering relationships that CSPs 110 and customers 108 would maintain on a pair-wise basis. Instead, a customer 108 may configure a single eBGP peering relationship with cloud exchange 100 and receive, via the cloud exchange, multiple services from one or more CSPs 110. While described herein primarily with respect to eBGP or other layer 3 routing protocol peering between colocation facility points and customer, NSP, or service provider networks, the colocation facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above for a cloud exchange deployment, customer network 202B in FIG. 2 is illustrated as having contracted with the cloud exchange provider for cloud exchange 100 to directly access layer 3 services via cloud exchange 100 and also to have contracted with NSP 106B to access layer 3 services via a transit network of NSP 106B. Customer network 202A is illustrated as having contracted with NSP 106B to access layer 3 services via a transit network of NSP 106B. The contracts described above may be instantiated in network infrastructure 206 of the cloud exchange 100 by L3 peering configurations within switching devices of NSPs 106 and cloud exchange 100 and L3 connections, e.g., layer 3 virtual circuits, established within cloud exchange 100 to interconnect CSPs 110 to NSPs 106 and customer networks 202, all having at least one port offering connectivity within cloud exchange 100.

In some examples, network infrastructure 206 includes one or more virtual machines or containers of NFVi 102 that is used to deploy Virtualized Network Functions. In these examples, network service orchestrator 112 may receive a request via service interface 114 to deploy one or more virtualized network functions (e.g., virtual router, load balancer, and/or the like) that are implemented in NFVi 102 of network infrastructure 206. Network service orchestrator 112 may request a VNF distribution including one or more VNF images from a VNF provider, e.g., VNF provider 210.

Figure 3:
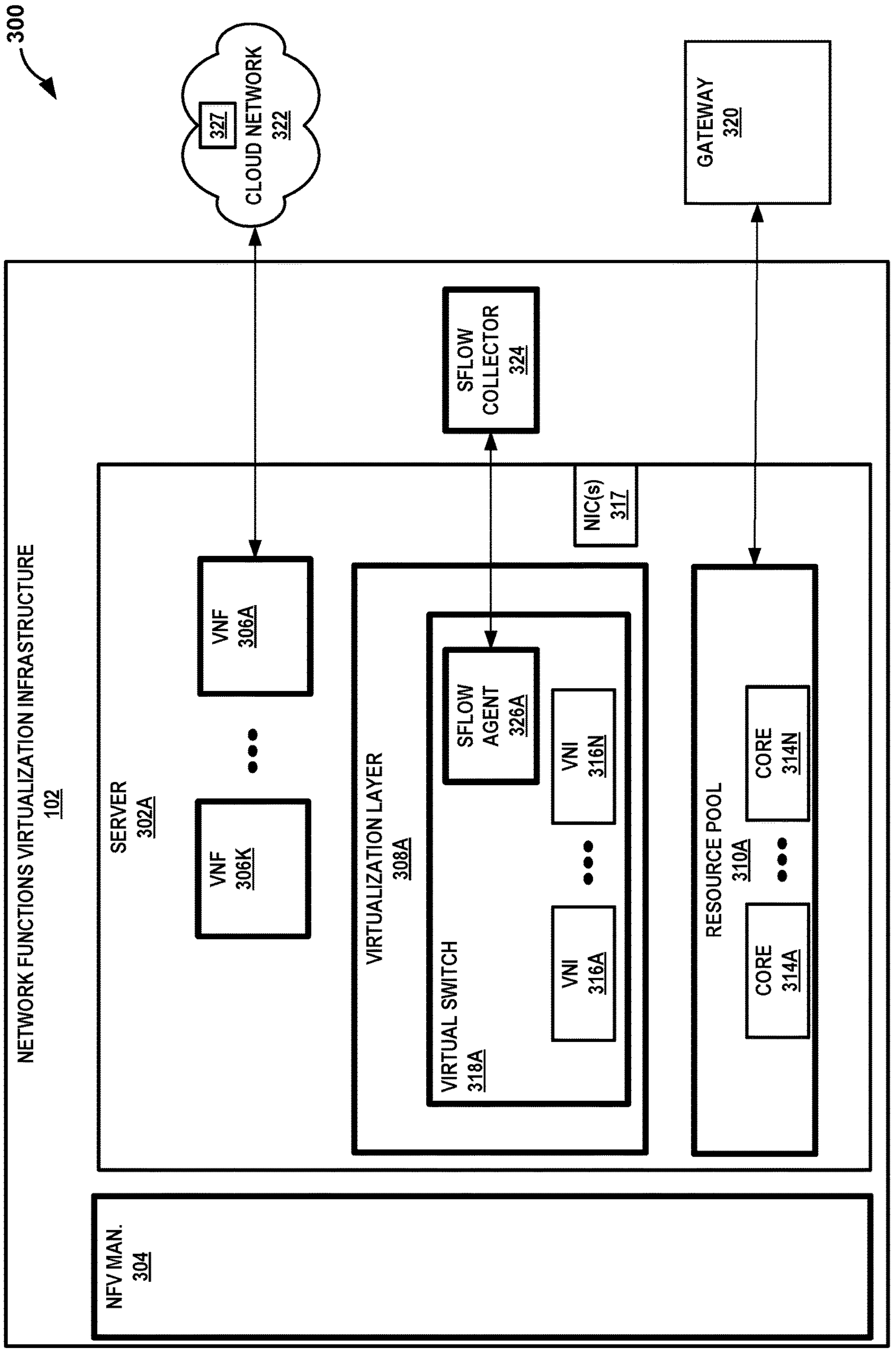
FIG. 3 is a block diagram that illustrates an example Network Function Virtualization Infrastructure having tenant-driven resource allocation according to techniques described herein.

Further details regarding the example network system of FIG. 3 and example data center 200 of FIG. 2 may be found in U.S. Provisional Patent Application Ser. No. 62/908,976 entitled "VIRTUALIZED NETWORK FUNCTIONS VERIFICATION USING DECENTRALIZED IDENTIFIERS," filed on Oct. 1, 2009, which is hereby incorporated by reference herein.

As described above with respect to FIG. 1, orchestrator 112 may dynamically allocate compute resources for servers of NFVI 102 to tenant VNFs for tenants of the data center 200/NFVI 102 provider, based on aggregate bandwidths for flows processed by the tenant VNFs.

FIG. 3 is a block diagram that illustrates an example architecture for Network Function Virtualization Infrastructure having tenant-driven dynamic resource allocation according to techniques described herein. In the example of FIG. 3, system 300 refers to an exchange point (e.g., a cloud exchange point) having Network Functions Virtualization infrastructure (NFVi) 102 connecting customer devices, via gateway 320, and cloud service providers running on cloud network 322. In some examples, NFVi 102, gateway 320, and/or cloud network 322 may be provided in a data center environment.

NFVI 102 includes one or more servers 302A-302N (servers 302) for executing/hosting network services including a virtual network device connecting customer devices with cloud services. The example architecture of NFVi 102 enables deployment one or more services, such as Virtualized Network Functions (VNFs), on servers 302. NFVi 102 includes computing hardware, storage hardware, and network hardware for executing Virtual Network Functions (VNFs). NFV management 304 handles deployment and organization of these network services, for example, by instantiating VNFs on servers 302 to execute such services. As instructed by an orchestration system, NFV management 304 designates resources (e.g., resource capacities) in servers 302 to support execution of VNFs.

A VNF may provide similar functionality to hardware-based network devices such as dedicated network appliances, but VNFs provide such functionality in software. A VNF is primarily a software construct and thus may be decoupled from the underlying hardware. For example, VNF 306A can provide the same routing, switching firewall, intrusion detection or other services that have traditionally been provided by specialized hardware, but in software. VNF 306A can provide forwarding and network address translation services for network traffic to and from the VNF 306A. In some examples, VNF 306A—in a role as a routing VNF or virtual router to cloud network 322—performs routing and forwarding operations on packets from customer devices.

In the example of FIG. 3, NFVI 102 platform includes servers, e.g., server 302A, running virtualization software (e.g., hypervisors) in virtualization layers that enable virtual execution environments on which VNF images (including the network infrastructure software) are deployed. Server 302A may represent an example instance of any of servers 123 of FIG. 1. Virtualization layer 308A may operate a platform for virtualizaing network infrastructure components (e.g., for data plane and control plane functionality) including networking protocols such as those using in routing/switching. Server 302A may provide via virtualization layer 308A one or more virtual machines (VMs) of which each VM emulates hardware for running software. In other words, an example VM (e.g., a LINUX kernel VM (KVM)) provides a virtualized operating system and application suite (e.g., to deploy VNFs) for customer access. Alternatively, or additionally, server 302A may provide containers (e.g., such as those provided by the open source Docker Container application), or other virtual execution environments in which VNFs are implemented. In some examples, NFVi 102 further includes a virtualization layer 308A over the hardware to offer virtual computing, virtual storage, and virtual network for executing VNFs. NFVi 102 may be executed by one or more computing devices in a centralized or distributed manner.

In the example of FIG. 3, server 302A may be part of a computer cluster or pod whose physical resources are virtualized into network infrastructure such as NFVI 102. The computer cluster may be labeled a network edge for cloud service providers. Each cloud service provider may be a data center tenant having one or more VNFs running in servers 302, e.g., server 302A, to provide access to cloud services from devices in cloud network 322. As the network edge, server 302A executes a VNF to perform network edge services such as routing and forwarding operations for packets directed to that VNF and intended for cloud service providers on cloud network 322 or received from cloud service providers on cloud network 322. However, VNF may apply a network function to flows destined to or sourced by any network, the flows associated with one or more tenants of the NFVI 102 provider.

An orchestration system (e.g., network service orchestrator 112) in control over resource orchestration in NFVi 102 may use NFV management 304 for NFVI 102 to instruct server 302A to allocate compute resources among VNFs according to techniques described herein. These techniques direct usage-based allocations of resources towards executing VNFs. In view of service level agreements and overall goals of the data center and/or the tenant, one example technique optimizes an resource allocation upon balancing of two tenant/data center conditions: 1) a quality of service (QoS) expectation on behalf of the tenant (i.e., actual resource utilization) and 2) a quality of service (QoS) obligation on behalf of the data center provider (i.e., resource requirement).

NFV management 304 distributes physical resources of resource pool 310 to VNFs running in servers 302 of NFVI 102. Examples of the various physical resources include processing resources (e.g., processor cores), networking resources (e.g., physical network interface cards (NICs)), and memory resources. A plurality of processor cores 314A-314N ("processor cores 314") may be examples of processing or compute resources. In one example, using virtualization layer 308A to generate an abstraction of various physical resources of resource pool 310A, NFV management 304 configures that abstraction into countable virtual resources use by VNFs running in servers 302 of NFVI 102. Physical resource may be virtualized into virtual compute resources of which each resource (unit) includes one or more processor cores. Another compute resource may be a compute node such as a virtual machine. Other virtual resources include virtual storage resources and virtual network resources.

NFV management 304 may couple virtual network interfaces in VNI space such as VNIs 316A-N (or VNIs 316) to virtual switch 318A. Virtual switch 318A is configured with VNIs 316, which are logical interfaces where encapsulation and decapsulation for virtual networking in the NFVI 102 occurs. Each of VNIs 316 may be associated with a virtual network of the NFVI 102 that is assigned to a tenant. That is, a tenant may be assigned one or more virtual networks for packet flows. The virtual network may have a corresponding virtual network identifier, such as a VXLAN network identifier. Packet flows that are transported using these virtual networks are associated with the tenant, and packets of such a packet flow may include the virtual network identifier for the virtual network on which the packet flow is transported.

In one example, virtual switch 318A may be configured with VXLAN interfaces, each VXLAN interface being configured with a different VNI and corresponding VNI identifier of VNIs 316. When physical network interfaces in server 302A (e.g., NIC 317) receive network traffic in form of one or more packet flows of which packets include information identifying those VNIs 316 (e.g., having same VNI identifiers). Virtual switch 318A switches each packet flow to their correct VNF which may be the VNF to which the VNIs are assigned. sFlow agent 326A collects a packet flow data, including the VNI per flow, and sends the collected packet flow data to the collector.

Statistics and other data points associated with the transmitted packet flows may provide useful information, for example, for vector packet processing by VPP 318A and for tenant-driven dynamic resource allocation for VNFs by the orchestration system for NFVI 102 that may be running in the same data center environment as server 302A. sFlow agent 326A captures and then, provides these statistics and other data points to sflow collector 324, which combines the provided statistics and other data points with information provided by other sFlow agents 326 in other servers 302.

In some examples, sFlow Collector 324 leverages SNMP to communicate with sFlow Agent 326A in server 302A in order to configure sFlow monitoring on VNF 306A. sFlow Agent 326A uses two forms of sampling mechanisms: statistical packet-based sampling of switched or routed Packet Flows, and time-based sampling of counters. In general, Packet Flow Sampling and Counter Sampling is performed by sFlow Instances associated with individual data sources within sFlow Agent 326A. In order to perform Packet Flow Sampling, an sFlow Instance is configured with a Sampling Rate. The Packet Flow sampling process results in the generation of Packet Flow Records. In order to perform Counter Sampling, an sFlow Instance is configured with a Sampling Interval. The Counter Sampling process results in the generation of Counter Records. The sFlow Agent 326A collects Counter Records and Packet Flow Records and sends them in the form of sFlow Datagrams to sFlow Collector 324.

Packet Flow Sampling, an example of Packet Flow Monitoring, is accomplished as follows: When a packet arrives on an interface (e.g., VNI 316A), VNF 306A makes a filtering decision to determines whether the packet should be dropped. If the packet is not filtered, a destination interface is assigned by VNF 306A switching/routing function. At this point, sFlow Agent 326A determines whether or not to sample the packet. sFlow Agent 326A uses a counter that is decremented with each packet. When the counter reaches zero a sample is taken, whether or not a sample is taken, the counter Total_Packets is incremented and Total_Packets is a count of all the packets that could have been sampled. sFlow Agent 326A, using Counters such as the counter Total_Packets, generates a variety of information including flow statistics. Agents/component of the orchestration system described herein may use these flow statistics to instruct NFVI 102 regarding whether or not to modify an allocated resource capacity, such as an allocation of compute resources. In one example, the collected flow statistics may be used to add or subtract one or more compute resources (e.g., virtual and physical compute nodes such as processor cores in a multi-core environment).

To illustrate by way of example, the orchestration system may modify a (current) allocation of compute resources to a running VNF (e.g., VNF 306A) based upon actual bandwidth usage such that the running VNF may consume at most the modified allocation of compute resources. In one implementation, sFlow Agent 326A may compute a bandwidth utilization rate based upon the counter Total_Packets, one or more flow statistics, and time information (e.g., a time interval (in seconds)), sFlow Agent 326A computes a bandwidth utilization rate (e.g., packet processing rate or throughput over the given time interval). In one example, sFlow Agent 326A computes a flow statistic to assist in the bandwidth utilization computation, one example flow statistic includes a number of packets per second (or simply Packets per second (PPS)). In another example, sFlow Agent 326A computes a flow statistic known as an average packet size per individual flow, which may be aggregated into the average packet size for a tenant's flows. By multiplying the average packet size and the packets per second, sFlow agent 326A computes the bandwidth utilization rate. As an alternative, sFlow agent 326A may compute the bandwidth utilization rate using a different counter, such as a counter that is incremented for each byte in a packet flow. This counter may determine a total number of bytes in the packet flow. Using this counter and timestamp data, sFlow agent 326A may compute the bandwidth utilization rate by dividing the total number of bytes by a time interval (in seconds).

Taking a sample involves either copying the packet's header or extracting features from the packet and storing the sampled information in a sFlow datagram. Example flow attributes of the sampled information include: a source address SRC, a destination address DEST, a virtual network identifier (e.g., virtual network identifier such as a VXLAN network identifier or one of VNIs 316), and a packet size. Based upon an average packet size—assuming that the packet size is consistent across the packets—and the counter Total_Packets average (e.g., per flow), sFlow Agent 326A computes an average bandwidth utilization rate.

An sFlow Datagram contains lists of Packet Flow Records and Counter Records. The format of each record is identified by a data_format value. The data_format name space is extensible, allowing for the addition of standard record types as well as vendor specific extensions. A number of standard record types have been defined. However, an sFlow Agent is not required to support all the different record types, only those applicable to its treatment of the particular packet being reporting on. For example, if VNF 306A implements a layer 2/3 switch, VNF 306A reports to sFlow agent 326A layer 2 information for packets it switches, and layer 2 and 3 information for packets it routes. The data_format uniquely identifies the format of an opaque structure in the sFlow specification. A data_format is constructed to uniquely identify the format of the structure (e.g., a standard structure). An example data_format could identify a set of flow attributes when used to describe flow_data.

Every time a sample is taken, the counter Total_Samples, is incremented. Total_Samples is a count of the number of samples generated. Samples are sent by the sFlow Instance to the sFlow Agent 326A for processing. The sample includes the packet information, and the values of the Total_Packets and Total_Samples counters. The sFlow Agent 326A may then use the samples to obtain additional information about the packet's trajectory through NFVI 102. Such information depends on the forwarding functions of VNF 306A. Examples of trajectory information provided are source and destination interface, source and destination address, source and destination VLAN, next hop subnet, full AS path. Details of the trajectory information are stored in the sFlow Datagram Format along with an average bandwidth rate. Virtual switch 318A assumes that the trajectory information applies to each packet.

Virtual Switch 318A refers to a vector packet processing application built on a software platform (e.g., proprietary and open source versions of CISCO® Vector Packet Processing technology). Virtual switch 318A, in general, provides a data plane functionality (e.g., in a virtual router or virtual switch) including packet forwarding operations. Virtual switch 318A includes a set of forwarding nodes arranged in a directed graph and a supporting framework. The framework has all the basic data structures, timers, drivers (and interfaces to driver software development kits (e.g., data plane development kit (DPDK)), a scheduler which allocates the CPU time between the graph nodes, performance and debugging tools, like counters and built-in packet trace. The latter enables capturing the trajectory information or the paths taken by the packets within the graph with high timestamp granularity, giving full insight into the processing on a per-packet level. Virtual switch 318A may process trajectory information such as the trajectory information determined by the framework and any trajectory information generated via flow monitoring. Virtual switch 318A may couple to VNI interfaces and process packets that arrive through physical network hardware on server 302A. Using the trajectory information, virtual switch 318A assembles those packets into a vector, e.g. Virtual switch 318A sorts packets by protocol or format and when software nodes in Virtual switch 318A are scheduled, Virtual switch 318A takes its vector of packets and processes them in a tight dual loop (or quad-loop) with prefetching to the CPU cache to achieve optimal performance.

Cloud network 322 may communicatively couple VNF 306A to one or more cloud services 327). Cloud network 322 may be generally hidden from or otherwise unavailable to devices on a public network. For example, cloud network 322 may receive packet flows from the VNF 306A that are communicated to a cloud service from a customer device or another cloud service. Examples of cloud services include Google Cloud, Azure, Oracle Cloud, Amazon Web Services (AWS), IBM Cloud, Alibaba Cloud, and Salesforce. In some aspects, cloud network 322 can be an Equinix Cloud Exchange Fabric provided by Equinix Inc. of Redwood, California. VNF 306A may be a vendor-neutral VNF that combines two or more cloud services into a hybrid cloud service.

Gateway 320 may communicatively couple VNF 306A to a public network and/or a private network of customer devices. A public network may be a network that is publicly available with few or no restrictions. For example, the public network may be a network that is part of the Internet. A private network may be a network that is part of an enterprise network and only accessible to authorized users. Customer devices are clients of VNF 306A and, as an example, may be computing devices located in a branch office of the tenant or otherwise associated with the tenant or customer. Public gateway may receive traffic having a destination address of the server 302A hosting the VNF 306A within the data center from the public network. VNF 306A may receive network traffic from gateway 320.

When the above-mentioned orchestration system (e.g., orchestrator 112 of FIG. 1), as an example, performs an initial resource allocation for VNF 306A, a particular tenant's VNF, and in response, NFV management 304 deploys VNF 306A on server 302A as a virtual point of presence VNF (e.g., a routing VNF connecting customer devices with the particular tenant's cloud service in cloud network 322). NFV management 304 also assigns a portion of VNI space to that particular tenant to use for receiving/transmitting packet flows to/from customer devices/cloud services. The VNI space may refer to a range of virtual network identifiers for corresponding virtual network interfaces 316A-316N (VNIs 316). NFV management 304 distributes virtual networks in the physical network for NFVI 102 among a plurality of tenants. Each of the virtual networks may represent an overlay network, e.g., a VXLAN, and be associated with a virtual network identifier, e.g, a VXLAN network identifier. The virtual network identifier may included in packets to identify the virtual network for the virtual switch 318A to facilitate forwarding by virtual switch 318A to one of VNFs 306 and to a next-hop device.

In one example, NFV management 304 assigns VNI 316A and a corresponding address to the particular tenant's VNF, VNF 306A, in server 302A. The corresponding address may be a Layer 2 or a Layer 3 construct to uniquely identify VNI 316A as a destination for packet flows directed to the particular tenant's cloud service. For at least this reason, the particular tenant's assigned network address may be stored in packets of the packet flows (e.g., in packet headers)—possibly along with the assigned VNI 316A. When the packets arrive at gateway 320 (or in another network device), the assigned address is extracted and translated into a VNI identifier (e.g., number) matching the assigned VNI identifier for VNI 316A. Hence, the corresponding VNI identifier for VNI 316A uniquely identifies the particular tenant's assigned VNI such that packets delivered to that VNI are forwarded (in part) by Virtual switch 318A to the VNF 306, the particular tenant's VNF.

VNF 306A manages network traffic to and from cloud services communicatively coupled to server 302A via cloud network 322. VNF 306A may process network traffic that includes the network address (e.g., an IP address for server 302A) as a source or destination address when communicating over gateway 320 or cloud network 322. In some examples, multiple VNFs on server 302A can each have a distinct public IP address that shares a single physical network interface. In the example of FIG. 1, servers 302 and VNFs 306 are described as the current NFVi infrastructure. It is noted that a current NFVi infrastructure may include only one server and only one VNF or, alternatively, more than one server including more than one VNF.

In accordance with techniques described in this disclosure, in some aspects, VNF 306A may form part of the particular tenant's network service. The tenant may have purchased resources for executing the network service from the data center provider such that the purchased resources are a requirement that the data center provider is obligated to provide. As described herein, in a number of instances, the tenant's network services does not actually utilize all the purchased resource, leaving a substantial resource capacity unused and wasted.

In some examples, an amount of network traffic directed to the particular tenant's VNF fluctuates in such a manner that the particular tenant's VNF may not fully utilize the initial allocation of resources (e.g., compute resources) under certain circumstances. The particular tenant, the cloud service provider, and/or the data center provider may have over-estimated an expected amount of network traffic and thus, purchased unnecessary resource capacities including extraneous bandwidth capacity (e.g., in a service level agreement (SLA)). Over time, the orchestration system of NFVI 102 may determine that the particular tenant's VNF consistently utilizes only a portion of the initial allocation of physical resources (bare metal servers, communication infrastructure etc.) provided by the data center and for at least reason, may modify the particular tenant's VNF's (current) resource allocation, for example, to match the particular tenant's VNF's actual resource usage (e.g., bandwidth utilization). In some examples, the orchestration system of NFVI 102 also modifies the SLA to update a resource requirement/obligation to the particular tenant for executing that tenant's VNF; in this manner, the orchestration system of NFVI 102 does not violate the SLA by modifying the resource allocation while maintaining an expected quality of service. In some examples, the orchestration system of NFVI 102 achieves an optimal resource allocation in which a maximum capacity of compute resources are available for executing a new VNF and/or a maximum number of VNFs are executing at a same time.

As described herein, flow information captured by sFlow agent 326A may be mined for flow statistics associated with tenants and tenant VNFs including the particular tenant and the particular tenant VNF, VNF 306A. Over a time period, each tenant to NFVI 102 and server 302A receives a plurality of packet flows. In some examples, the orchestration system of NFVI 102 may use NFV management 304 to map each plurality of packet flows' VNI to the VNI space corresponding to VNIs 316 by correlating the flow statistics with tenant information. In some examples, the orchestration system uses sflow agent 326A to identify VNI(s) that is/are assigned to a particular tenant from the tenant information and using that assigned VNI, to identify corresponding flow statistics having the same VNI(s).

The orchestration system uses the corresponding flow statistics to compute various statistics and other informational data points. The corresponding flow statistics may indicate values for various variables describing a packet flow including a total number of packets, a total amount in bytes, packets per second, an average packet size or distribution of packet size(s) and/or the like. In some examples, the orchestration system uses these flow statistics to compute an aggregate bandwidth for the plurality of flows associated with the particular tenant of the data center provider and processed by the tenant's VNF executing on server 302A and then, modifies, based on the aggregate bandwidth, an allocation of compute resources of the server 302A executing the VNF. In some examples, the allocation of compute resources refers to an allocation of physical (hardware) processor resources (e.g., processing circuitry) towards executing the VNF.

In some examples, the orchestration system is configured to compute an average bandwidth for (packet) flows through one VNI based upon the corresponding flow statistics. The orchestration system may determine the average packet size from the corresponding flow statistics, for example, by aggregating packet sizes and dividing by a total number of packets. As an alternative, the orchestration system may determine an average packet size from the corresponding flow statistics, for example, by extracting that average from stored sflow datagrams. Once the average packet size is known, the orchestration system may then compute the average bandwidth by multiplying a number of packets per second (PPS) by the average packet size and compute the aggregated bandwidth as a summation of each average bandwidth of a plurality of packet flows. In another example, the orchestration system may compute the average bandwidth by dividing a total number of bytes by an amount of time in seconds and compute the aggregated bandwidth as a summation of each average bandwidth of a plurality of packet flows.

In some examples, the orchestration system compares an allocation of bandwidth to the aggregate bandwidth to produce a comparison result and (possibly) store the comparison result for trending. In some examples, to comply with an SLA obligating resources of server 302A towards executing the VNF, the orchestration system of NFVI 102 may provide an allocation of compute resources that satisfies at least a minimum or sufficient resource requirement for executing the VNF. The orchestration system of NFVI 102 may analyze the comparison result to determine whether (or not) to modify the allocation of compute resources (e.g., while maintaining compliance with the SLA). If the comparison result indicates resource under-utilization (e.g., of the compute resource or another resource (e.g., bandwidth)) by VNF, the orchestration system of NFVI 102 may modify the allocation by reducing the allocation of compute resources to a capacity that is optimal for the aggregated bandwidth. In some instances, the orchestration system of NFVI 102 may break the SLA and allocate fewer then the allocation of compute resources.

In some examples, the orchestration system of NFVI 102 (periodically) repeats the comparison (e.g., after a time interval) and stores each comparison result for trending. Over time, the comparison results develop into a relationship between the VNF's performance (e.g., in terms of bandwidth utilization) and the VNF's allocation of compute resources. For example, the orchestration system of NFVI 102 may combine (a sequence of) aggregate bandwidth measurements into an aggregate bandwidth trend. The orchestration system of NFVI 102 may modify, based on the aggregate bandwidth trend, the allocation of compute resources to the execution of the VNF. Assuming steady network traffic, the aggregate bandwidth trend eventually converges into a well-defined mapping that can be used when deploying the tenant VNF in another virtual execution environment in another NFVI. When the aggregate bandwidth changes (e.g., due to changes in level of network traffic), the orchestration system of NFVI 102 performs a comparison between the current allocation of bandwidth to an updated aggregate bandwidth to produce an updated comparison result for trending. In some instances, the updated comparison result may indicate an inability to meet a sufficient bandwidth and an opportunity to modify the resource allocation by adding one or more compute resource (e.g., processor cores).

The orchestration system may perform the abovementioned comparison with different resource configurations to determine maximum achievable (aggregated) bandwidth trend(s) for (a progression of) allocations of compute resources. The orchestration system may store several mappings between different allocations of compute resources and a corresponding maximum achievable (aggregated) bandwidth trend in a resource allocation table. The orchestration system may modify the allocation of compute resources based upon the resource allocation table. In other examples, the orchestration system may use the resource allocation table for an initial or modified allocation of compute resources toward executing the same or similar VNF in another NFVI or in another data center.

Figure 4:
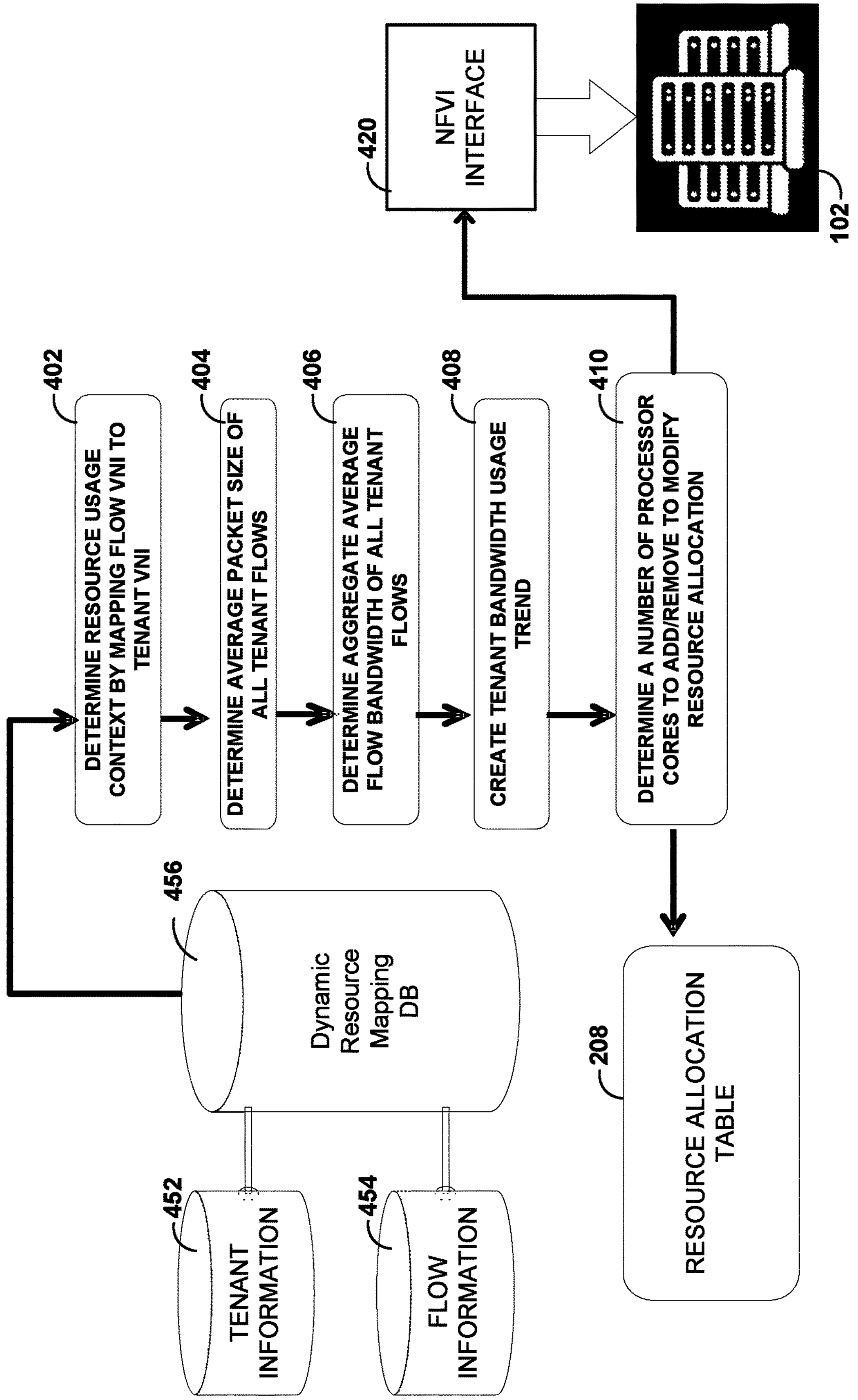
FIG. 4 is a flowchart illustrating example operations for tenant-driven resource allocation based upon actual resource usage according to techniques described herein.

FIG. 4 is a flowchart illustrating example operations for tenant-driven resource allocation based upon actual resource usage according to techniques described herein.

The (following) example operations may be performed by an orchestration system—a computing system in control over NFVI in a data center—such as when the orchestration system recognizes that a tenant's VNF bandwidth consumption (rate) fails to meet the tenant's VNF bandwidth allocation. In some aspects, the tenant's VNF may be implemented on a physical or virtual machine in the data center. The data center may include a gateway (e.g., a public or private gateway) that receives network packets from a network (e.g., a customer network or a cloud service network) that have a destination address for the tenant's VNF (e.g., a public IP address). If the tenant's customers rarely (if ever) require the total VNF bandwidth allocation, the orchestration system may perform the following example operations, for example, instructing a server hosting the tenant's VNF to increase or decrease the VNF's allocated resource capacity.

The following operations are described with respect to orchestrator 112 of FIG. 1 as an example orchestration system. In some examples, orchestrator 112 determines a resource usage context by mapping flow VNI to tenant VNI (402). Tenant information 452 stores information associated with each tenant of a data center provider that is assigned one or more VNFs in the data center. Tenant information 452 also stores, for each tenant, the virtual network identifiers for virtual networks configured for use for flows associated with the tenant. Some of these virtual network identifiers for the tenant may be configured on servers of NFVI to cause the virtual switch of the server to switch packets having those virtual network identifiers to a tenant VNF. This set of virtual network identifiers is referred to as the VNF VNI space. Flow information 454 stores information describing a plurality of flows associated with each tenant of the data center provider, each flow referring to packets being forwarded through the NFVI between endpoints (e.g., between tenant customers and service providers). Each of tenant information 402 and flow information 404 stores VNIs that can be used as an index for mapping each tenant to their corresponding flows. Tenant information 402 and flow information 404 are combined such that each tenant VNI in tenant information is mapped to each flow VNI in flow information 404. Dynamic resource mapping database 456 may be created to store the mappings between the flow VNI and the tenant VNI.

If tenant information 452 is organized into a database, an example entry in that database may be structured as follows:

```
Tenant1 {
  VNF Type: Router
  VNF Vendor: CSCO
  VNF License: Security
  VNF Bandwidth: 5G
  VNF VNI space: 10 - 20
  Public IP address: 182.1.1.2/32}
```

If flow information 454 is organized into a database, example entries in that database may be structured as follows:

```
FLOW1 {
  Source Address: 10.18.91.100
  Destination Address: 20.16.17.11
  VNI: 10
  Average Bandwidth: 100 mbps }
FLOW2 {
  Source Address: 11.12.172.11
  Destination Address: 33.192.11.190
  VNI: 12
  AVG BW: 1Gbps }
```

To identify flows associated with a tenant, network service orchestrator 112 maps a VNI for a flow, e.g., VNI: 10 for FLOW1, to the VNF VNI space for a tenant, e.g., VNF VNI space: 10-20 of Tenant1. If the VNF VNI space for a tenant includes the VNI for the flow, then the flow is associated with the tenant. Multiple flows associated a tenant are then aggregated, based on the flow records, to compute an average packet size and average bandwidth for instance. When flow information 454 and tenant information 452 is combined into dynamic resource mapping database information 456, example entries in that database may be structured as follows:

```
Tenant1 {
  Actual Resource: {
    Actual BW utilization: 10G
    Core(s): 8
    Memory: 8 GB }
  Bandwidth Usage: {
    Flows : 1000
    Avg Packet Size: 256
    Avg BW: 4.5 G } }
Tenant 2{
  Actual Resource: {
    Actual BW   : 5G
    Core : 4
    Memory: 4GB}
  Bandwidth Usage: {
    Flows : 560
    Avg Packet Size: 1000
    Avg BW: 2.5G } }
```

Orchestrator 112 determines an average packet size for all tenant flows (404). Flow information 454 stores packet flow statistics corresponding to an amount of data (in number of bytes) being received at a network edge of the data center over a period of time. The network edge may be an exchange point comprising a pod or cluster of servers that virtualize resources for NFVI. In some examples, dynamic resource mapping database 456 stores a rate (e.g., in packets or bytes) at which a particular tenant's data is received and forwarded through the NFVI. From this rate, orchestrator 112 computes an average packet size, which also may be stored in dynamic resource mapping database 456. In some examples, dynamic resource mapping database 456 stores the average packet size for data at each VNI assigned to the particular tenant.

Orchestrator 112 determines an aggregated bandwidth (i.e., an aggregated average bandwidth) for all flows associated with the tenant (406). As mentioned above, dynamic resource mapping database 456 stores the rate (e.g., in packets or bytes) at which bandwidth is consumed by the particular tenant's VNF for data received at each VNI and over time, that rate may represent an average rate per packet flow; by combining each VNI' s corresponding rate, orchestrator 112 determines an aggregated rate for data received at all the VNIs assigned to that particular tenant.

In some examples, orchestrator 112 creates a tenant bandwidth usage trend (408). In some examples, orchestrator 112 plots a data point representing the aggregated average bandwidth against an allocation of compute resources and stores that data point for trending. That data point may correlate the actual rate at which the particular tenant's packet flows are received and forwarded through NFVI 102 with a number of processor cores allocated to such packet processing. Over time, orchestrator 112 plots a number of data points representing a trend between the allocation of processor cores and an achievable aggregate bandwidth for the particular tenant's VNF. In this manner, orchestrator 112 may compute a maximum bandwidth rate that is possible for any VNF being executed in NFVI 102 based upon that VNF's allocation of processor cores (or another compute resource). Orchestrator 112 may store that maximum bandwidth rate and the VNF's allocation of processor cores in a resource allocation table such as resource allocation table 208 of FIG. 2. Based on the trend of aggregate bandwidth for flows associated with a tenant of the data center provider and processed by a tenant VNF, orchestrator 112 may determine that additional compute resources (for trending higher aggregate bandwidth) or fewer compute resources (for trending lower aggregate bandwidth) should be assigned to the tenant VNF.

Orchestrator 112 determines a number of processor cores to add/remove to modify a resource allocation for the particular tenant (410). In some examples, orchestrator 112 modifies an allocation of compute resources towards executing the particular tenant's VNF. Orchestrator 112 may access resource allocation table 208 and determine the modified allocation of compute resources. If the tenant's VNF bandwidth utilization changes, as indicated by the aggregate bandwidth for tenant flows processed by the tenant VNF, orchestrator 112 may access resource allocation table 208 and, in accordance with that table, modify the allocation of compute resources to a server executing the particular tenant's VNF. For example, orchestrator 112 may use resource allocation table 208 to determine a number of processor cores to add or remove in order to meet the changed bandwidth utilization. In some examples, orchestrator 112 issues a function call through NFVI interface 420 to instruct NFVI management to add or remove the number of processor cores to the server executing the particular tenant's VNF.

Figure 5:
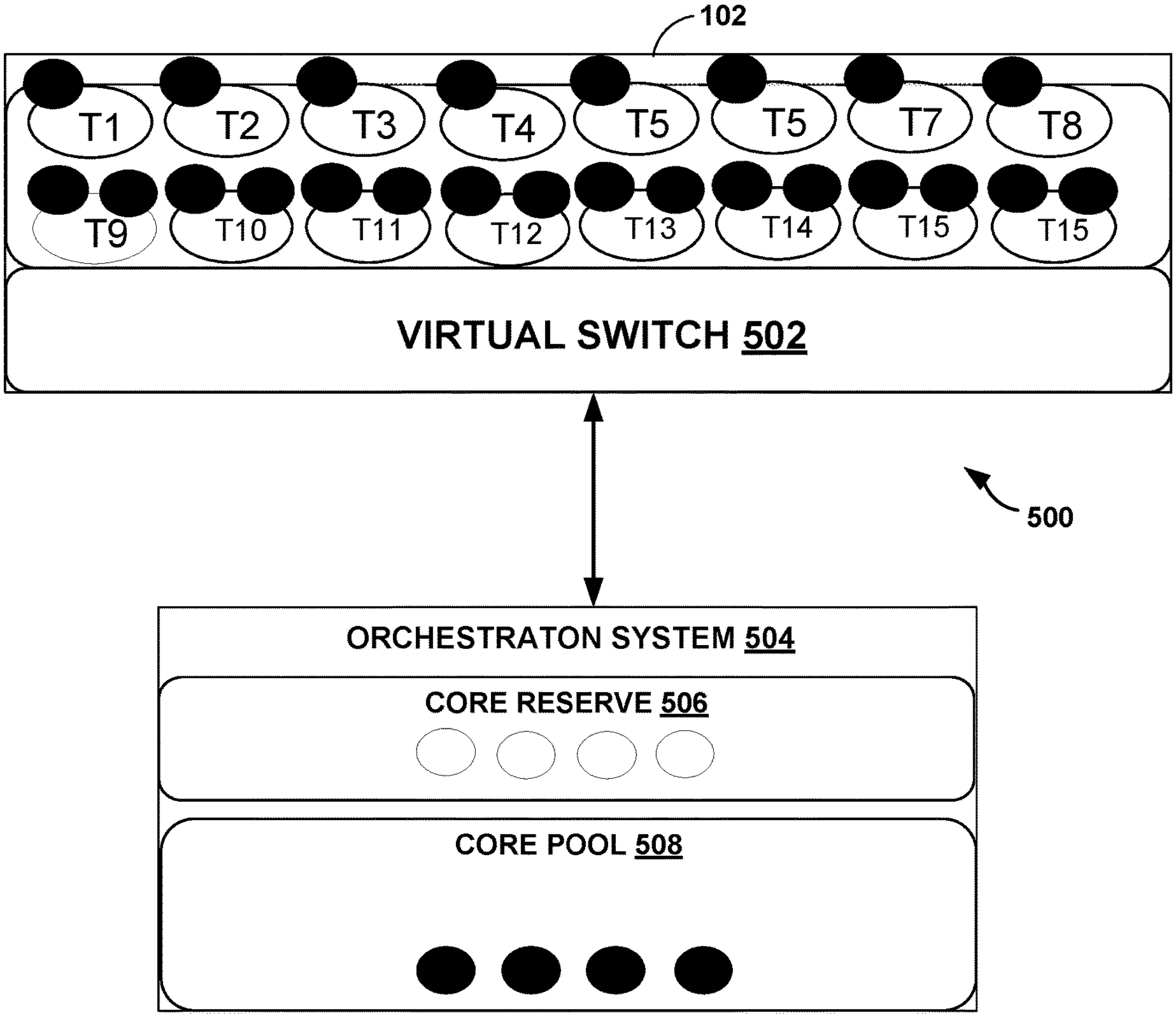
FIG. 5 is a block diagram illustrating further details of one example of a computing device that operates in accordance with one or more techniques of the present disclosure.

FIG. 5 is a block diagram illustrating a conceptual view of bandwidth usage-based processor core management in accordance with one or more techniques of the present disclosure. In FIG. 5, a plurality of data center tenants (or tenants) initiate VNFs in NFVI 102 running in compute node 500. Each tenant is illustrated in FIG. 5 as an oval graphic with letter "T" and a numeral. Each tenant is further illustrated in FIG. 5 with one or two black circular graphics representing either one or two processor cores and overlapping that tenant's oval graphic. Compute node 500 may present a physical compute node or, in some cases, a virtual compute resource that is an abstraction of physical processing resources in a computer cluster (e.g., a pod). Virtual switch 502 is coupled to the virtual compute resource and uses the virtualized physical processing resources to process packet flows received via a virtual network resource for compute node 500. In some examples, the virtual network resource may correspond to one or more VNIs.

Orchestration system 504 represents a functional block (e.g., a network service orchestrator) for NFVI 102. Orchestration system 504, in general, orchestrates resources (e.g., virtual resources) to instantiate VNFs to run network services for the plurality of tenants. In some examples, orchestration system 504 allocates to each VNF virtual compute resources such as one or more processors cores or other processing resources. In some examples, orchestration system 504 maintains core reserve 506 to include one or more processor cores that are unavailable for VNF allocation and utilization. In some examples, orchestration system 504 also maintains core pool 508 to include one or more processor cores that are available for VNF allocation and utilization. When compared to conventional NFVi implementations, FIG. 5 illustrates an improved NFVI with an increase in the maximum number of available cores for allocation to VNFs. In FIG. 5, between 2 and 4 additional cores are allocated to the VNFs associated with the tenants of compute node 500.

The following table illustrates some example realized benefits from transitioning from conventional resource orchestration techniques (i.e., a Present Mode of Operation (PMO)) to techniques described herein (i.e., Future Mode of Operation (FMO):

| | PMO | FMO |
|---|---|---|
| Compute Capacity (Core) | 36 | 36 |
| Core needed for 1xG vNF | 2 | 2 |
| Total 1xG vNF per compute | 18 | 20/22 |

-continued

| | PMO | FMO |
|---|---|---|
| Total compute per POD | 64 | 64 |
| VNF Capacity Per POD | 1152 | 1280/1408 |
| Cost Per vNF ($) - MRR | 500 | 500 |
| Expected MRR Per POD ($) | 576k | 640k/740k |

The above table demonstrates that those skilled in NFVi may allocate the additional available cores to increase the total number of the VNFs being executed at a particular moment in time. In the above table, a "POD" refers to the cluster of servers (e.g., servers 302 of FIG. 3) hosting the improved NFVI described herein.

Figure 6:
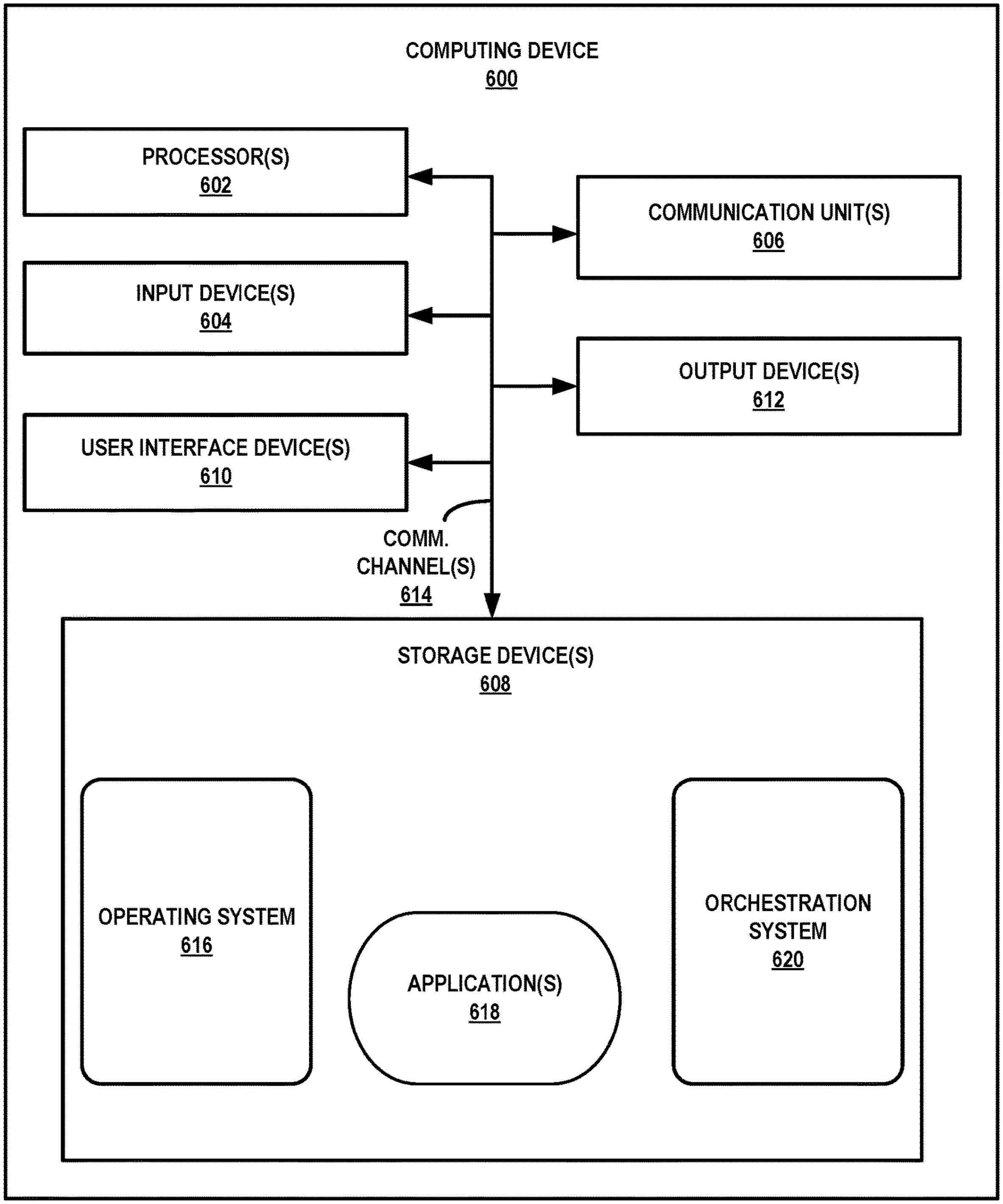
FIG. 6 is a block diagram illustrating a conceptual view of bandwidth usage-based processor core management in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 600 that includes one or more processor(s) 602 for executing any one or more of any system, application, or module described herein. For example, the one or more processor(s) 602 may execute instructions of orchestration system 620 to instantiate and deploy VNFs to NFVI and apply techniques described herein to determine and configure compute resource allocations for VNFs executing on servers of the NFVI. As such, computing device 600 may represent an example instance of network service orchestrator 112 or other orchestration system or other system to configure resource allocations for VNFs executing on servers of the NFVI in accordance with techniques of this disclosure. Other examples of computing device 600 may be used in other instances. Although shown in FIG. 6 as a stand-alone computing device 600 for purposes of example, a computing device may be any component or system that includes one or more processors or other suitable computing environment for executing software instructions and, for example, need not necessarily include one or more elements shown in FIG. 6 (e.g., communication units 606; and in some examples components such as storage device(s) 608 may not be co-located or in the same chassis as other components).

As shown in the specific example of FIG. 6, computing device 600 includes one or more processors 602, one or more input devices 604, one or more communication units 606, one or more output devices 612, one or more storage devices 608, and user interface (UI) device 610, and communication unit 606. Computing device 600, in one example, further includes one or more applications 622, programmable network platform application(s) 624, and operating system 616 that are executable by computing device 600. Each of components 602, 604, 606, 608, 610, and 612 are coupled (physically, communicatively, and/or operatively) for inter-component communications. In some examples, communication channels 614 may include a system bus, a network connection, an inter-process communication data structure, or any other method for communicating data. As one example, components 602, 604, 606, 608, 610, and 612 may be coupled by one or more communication channels 614.

Processors 602, in one example, are configured to implement functionality and/or process instructions for execution within computing device 600. For example, processors 602 may be capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication units 606. Computing device 600, in one example, utilizes communication units 606 to communicate with external devices via one or more networks, such as one or more wired/wireless/mobile networks. Communication units 606 may include a network interface card, such as an Ethernet card, an optical transceiver, a radio frequency transceiver, or any other type of device that can send and receive information. In some examples, computing device 600 uses communication unit 606 to communicate with an external device.

Computing device 600, in one example, also includes one or more user interface devices 610. User interface devices 610, in some examples, are configured to receive input from a user through tactile, audio, or video feedback. Examples of user interface devices(s) 610 include a presence-sensitive display, a mouse, a keyboard, a voice responsive system, video camera, microphone or any other type of device for detecting a command from a user. In some examples, a presence-sensitive display includes a touch-sensitive screen.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user.

Computing device 600 may include operating system 616. Operating system 616, in some examples, controls the operation of components of computing device 600. For example, operating system 616, in one example, facilitates the communication of one or more applications 618 with processors 602, communication unit 606, storage device 608, input device 604, user interface devices 610, and output device 612.

Application(s) 618 and Orchestration System 620 may also include program instructions and/or data that are executable by computing device 600. Furthermore, orchestration system 620, as an example, may include software to implement orchestrator 112 of FIG. 1 and may operate as illustrated and described herein. As instructed by orchestration system 620 running in a data center in which computing device 600 resides, a maximum number of VNFs are instantiated and executing at a same time. This may be accomplished in part by implementing techniques described herein. As one example, the orchestration system 620 may apply techniques described herein to determine an allocation of compute resources of servers for executing virtual network functions and configure NFVI (via a NFVI management system (e.g., NFVI management 304 of FIG. 3) coupled to) with a number of processor cores for the servers in accordance with the allocation. In one example technique, computing device 600 uses information stored in memory (e.g., resource allocation table 208 of FIG. 2) to determine the number of processor cores to allocate.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing system comprising:

processing circuitry having access to a storage device, the processing circuitry configured to:

determine a first packet flow and a second packet flow are associated with a particular tenant, wherein the first packet flow and the second packet flow are processed by a virtual network function (VNF) executing on a server, wherein the VNF is assigned to the particular tenant, wherein the VNF is allocated a bandwidth for the particular tenant, wherein the VNF is configured to execute using an allocation of at least one of a number of processing cores of the server or an amount of memory of the server;

compute, based on packet flow statistics for the first packet flow and the second packet flow, an aggregate bandwidth of a plurality of packet flows processed by the VNF and associated with the particular tenant;

compare the bandwidth for the particular tenant to the aggregate bandwidth to determine an unused number of processing cores or an unused amount of memory; and modify, based on the unused number of processing cores or the unused amount of memory, the allocation of the at least one of the number of processing cores of the server or the amount of memory of the server to reduce the allocated number of processing cores or the amount of memory.

2. The computing system of claim 1, wherein the computing system comprises one or more of an orchestration system for virtual network functions including the VNF or a controller for virtual network functions including the VNF.

3. The computing system of claim 1, wherein the processing circuitry is configured to compute, based on the packet flow statistics for the first packet flow and the second packet flow, an aggregate bandwidth trend for the plurality of packet flows processed by the VNF and associated with the particular tenant, and wherein to modify the allocation of the at least one of the number of processing cores of the server or the amount of memory of the server, the processing circuitry is configured to modify the allocation of the at least one of the number of processing cores of the server or the amount of memory of the server based on the aggregate bandwidth trend for the plurality of packet flows processed by the VNF and associated with the particular tenant.

4. The computing system of claim 1, wherein the storage device stores a mapping of one or more virtual network identifiers associated with the particular tenant, and wherein to determine the first packet flow and the second packet flow are associated with the particular tenant, the processing circuitry is configured to determine the first packet flow and the second packet flow are each associated with at least one of the one or more virtual network identifiers associated with the particular tenant.

5. The computing system of claim 4, wherein the first packet flow is associated with a first virtual network identifier of the one or more virtual network identifiers associated with the particular tenant, and wherein the second packet flow is associated with a different, second virtual network identifier of the one or more virtual network identifiers associated with the particular tenant.

6. The computing system of claim 1, wherein the VNF comprises a first VNF, and where the processing circuitry is configured to, based on the modified allocation of the at least one of the number of processing cores of the server or the amount of memory of the server, initiate a second VNF to execute on the server.

7. A method comprising:

determining, by a computing system, a first packet flow and a second packet flow are associated with a particular tenant, wherein the first packet flow and the second packet flow are processed by a virtual network function (VNF) executing on a server, wherein the VNF is assigned to the particular tenant, wherein the VNF is allocated a bandwidth for the particular tenant, wherein the VNF is configured to execute using an allocation of at least one of a number of processing cores of the server or an amount of memory of the server;

computing, by the computing system, based on packet flow statistics for the first packet flow and the second packet flow, an aggregate bandwidth of a plurality of packet flows processed by the VNF and associated with the particular tenant;

comparing, by the computing system, bandwidth for the particular tenant to the aggregate bandwidth to determine an unused number of processing cores or an unused amount of memory; and modifying, by the computing system, based on the unused number of processing cores or the unused amount of memory, the allocation of the at least one of the number of processing cores of the server or the amount of memory of the server to reduce the allocated number of processing cores or the amount of memory.

8. The method of claim 7, wherein the computing system comprises one or more of an orchestration system for virtual network functions including the VNF or a controller for virtual network functions including the VNF.

9. The method of claim 7, further comprising:

computing, by the computing system, based on the packet flow statistics for the first packet flow and the second packet flow, an aggregate bandwidth trend for the plurality of packet flows processed by the VNF and associated with the particular tenant, wherein modifying the allocation of the at least one of the number of processing cores of the server or the amount of memory of the server comprises modifying the allocation of the at least one of the number of processing cores of the server or the amount of memory of the server based on the aggregate bandwidth trend for the plurality of packet flows processed by the VNF and associated with the particular tenant.

10. The method of claim 7, further comprising:

obtaining a mapping of one or more virtual network identifiers associated with the particular tenant, wherein determining the first packet flow and the second packet flow are associated with the particular tenant comprises determining the first packet flow and the second packet flow are each associated with at least one of the one or more virtual network identifiers associated with the particular tenant.

11. The method of claim 10, wherein the first packet flow is associated with a first virtual network identifier of the one or more virtual network identifiers associated with the particular tenant, and wherein the second packet flow is associated with a different, second virtual network identifier of the one or more virtual network identifiers associated with the particular tenant.

12. The method of claim 7, wherein the VNF comprises a first VNF, the method further comprising:

initiating, based on the modified allocation of the at least one of the number of processing cores of the server or the amount of memory of the server, a second VNF to execute on the server.

13. Non-transitory computer-readable media comprising instructions for configuring processing circuitry to:

determine a first packet flow and a second packet flow are associated with a particular tenant, wherein the first packet flow and the second packet flow are processed by a virtual network function (VNF) executing on a server, wherein the VNF is assigned to the particular tenant, wherein the VNF is allocated a bandwidth for the particular tenant, wherein the VNF is configured to execute using an allocation of at least one of a number of processing cores of the server or an amount of memory of the server;

compute, based on packet flow statistics for the first packet flow and the second packet flow, an aggregate bandwidth of a plurality of packet flows processed by the VNF and associated with the particular tenant;

compare the bandwidth for the particular tenant to the aggregate bandwidth to determine an unused number of processing cores or an unused amount of memory; and modify, based on the unused number of processing cores or the unused amount of memory, the allocation of the at least one of the number of processing cores of the server or the amount of memory of the server to reduce the allocated number of processing cores or the amount of memory.

14. The non-transitory computer-readable media of claim 13, further comprising instructions for configuring the processing circuitry to:

obtain a mapping of one or more virtual network identifiers associated with the particular tenant and determine the first packet flow and the second packet flow are associated with the particular tenant by determining the first packet flow and the second packet flow are each associated with at least one of the one or more virtual network identifiers associated with the particular tenant.

15. The non-transitory computer-readable media of claim 14, wherein the first packet flow is associated with a first virtual network identifier of the one or more virtual network identifiers associated with the particular tenant, and wherein the second packet flow is associated with a different, second virtual network identifier of the one or more virtual network identifiers associated with the particular tenant.

16. The non-transitory computer-readable media of claim 13, wherein the VNF comprises a first VNF, the non-transitory computer-readable media further comprising instructions for configuring the processing circuitry to initiate, based on the modified allocation of the at least one of the number of processing cores of the server or the amount of memory of the server, a second VNF to execute on the server.

* * * * *